US010162063B2

(12) United States Patent
Sun et al.

(10) Patent No.: US 10,162,063 B2
(45) Date of Patent: Dec. 25, 2018

(54) RADIATION DOSE DETECTOR WITH EMBEDDED OPTICAL FIBERS

(71) Applicant: Harbin Yiaomi Technology and Development co., ltd, Harbin, Heilongjiang (CN)

(72) Inventors: Weimin Sun, Heilongjiang (CN); Daxin Zhang, Heilongjiang (CN); Boran Wang, Heilongjiang (CN); Kai Zhang, Heilongjiang (CN); He Tian, Heilongjiang (CN)

(73) Assignee: Harbin Yiaomi Technology and Development co., ltd, Harbin, Heilongjiang (CN)

( * ) Notice: Subject to any disclaimer, the term of this patent is extended or adjusted under 35 U.S.C. 154(b) by 241 days.

(21) Appl. No.: 15/095,003

(22) Filed: Apr. 8, 2016

(65) Prior Publication Data

US 2016/0223685 A1 Aug. 4, 2016

(30) Foreign Application Priority Data

Apr. 9, 2015 (CN) .......................... 2015 1 0166373

(51) Int. Cl.
| | |
|---|---|
| *H05B 1/00* | (2006.01) |
| *G01T 1/10* | (2006.01) |
| *G01T 1/02* | (2006.01) |
| *G02B 1/04* | (2006.01) |
| *G02B 6/36* | (2006.01) |

(52) U.S. Cl.
CPC ................ *G01T 1/10* (2013.01); *G01T 1/023* (2013.01); *G02B 1/045* (2013.01); *G02B 6/3624* (2013.01)

(58) Field of Classification Search
CPC ........... G01T 1/10; G01T 1/023; G02B 1/045; G02B 6/3624
See application file for complete search history.

(56) References Cited

U.S. PATENT DOCUMENTS

| | | | |
|---|---|---|---|
| 2009/0014665 A1* | 1/2009 | Fleming | .................. G01T 1/023 250/484.5 |
| 2010/0069749 A1* | 3/2010 | Lu | ........................... G01T 1/161 600/436 |

FOREIGN PATENT DOCUMENTS

FR 2911965 * 8/2008

* cited by examiner

*Primary Examiner* — Kiho Kim

(57) ABSTRACT

An embedded optical fiber radiation dose detector, includes: a first optical fiber probe, wherein a first end of the first optical fiber probe is connected to a first light intensity detector, and a second end of the first optical fiber probe is a detecting end, wherein a first fluorescent material is embedded in a terminal of the detecting end of the first optical fiber probe. Advantages are as follows: the optical fiber probes of the present invention have an embedded structure, wherein an optical fiber probe, whose core is hollow inside, is produced with a micro processing technology, and the fluorescent material is embedded therein, so as to significantly improve an efficiency of coupling radiation-generated fluorescent signals into the cores of the optical fibers, and significantly decreases a size of an optical fiber sensor.

4 Claims, 3 Drawing Sheets

RADIATION DOSE DETECTOR WITH EMBEDDED OPTICAL FIBERS

CROSS REFERENCE OF RELATED APPLICATION

The present invention claims priority under 35 U.S.C. 119(a-d) to CN 201510166373.0, filed Apr. 9, 2015.

BACKGROUND OF THE PRESENT INVENTION

Field of Invention

The present invention relates to a radiation dose detector, and more particularly to an embedded optical fiber radiation dose detector.

Description of Related Arts

Due to changes in environmental factors in modern society, the number of people worldwide suffering from cancer is rising, and radiotherapy, as an effective method for treating cancer, has been heavily used in medical community. In the course of radiotherapy, a lot of radiations such as α-ray, γ-ray and X-ray are applied to the tumor from different directions, which are able to damage the DNA of tumor cells to inhibit the growth and proliferation. However, if the patients receive too much radiation during radiotherapy, it will cause great harm to physical health organizations.

Conventionally, in the course of radiotherapy, due to lack of precise location and radiation dose control, too much damage is caused to surrounding healthy tissue by radiation. Thus, optimized effect of radiotherapy is to provide an optimal dose of radiation to a designated target area, while allowing the adjacent surrounding healthy tissues receive minimized radiation dose, which requires real-time monitoring tumor moving, and real-time detecting radiation dose and accumulated dose at tumor and surrounding healthy tissues thereof at a radiation area.

According to the paper "*Radiation Therapy Physical quality control and quality assurance*" (Deng Xiaowu, China Cancer 2008 Vol. 17 No. 8, page 660-665), since the 21st century, radiotherapy has developed to three-dimensional conformal radiotherapy, intensity modulated conformal radiotherapy and image guided radiation therapy stages, so as to provide millimeter-level target positioning and dynamic four-dimensional planing dose distribution computing. Even so, the conventional radiation dose control is still using indirect methods such as vitro measurements and phantom calibration (paper: "*For patients with IMRT plan dosimetry verification*" by Dai Jianrong, Hu Yimin, Zhang Chi, Guan Ying, Zhang Wang Chuang, Chinese Journal of Radiation Oncology, September 2004, Vol. 13 No. 3 page 229-233). Direct in-vivo measurements and in-vivo reusable position calibration methods are absent.

Conventionally, it is impossible to satisfy requirements for real-time monitoring radiation absorbed dose, because almost all standard sensors for detecting the radiation absorbed dose are too large, material safety thereof is insufficient, life time thereof is short, etc. In recent years, western countries began to study X-ray sensors whose X-ray fluorescent material is applied on a optical fiber surface where cladding is removed, which is able to detect radiation dose (Dan Sporea, Laura Mihai, Ion Tiseanu, *Multidisciplinary evaluation of X-ray optical fiber sensors*, Sensors and Actuators A, 213: 79-88, 2014). However, a proportion of fluorescent signal coupling into an optical fiber core with such technology is low, and sensitivity thereof is poor. Furthermore, such technology needs a large probe, which is difficult for in-vivo radiation dose measurement.

In view of the above shortcomings, present invention is finally obtained after a long period of study and practice.

SUMMARY OF THE PRESENT INVENTION

For solving the above problems, an object of the present invention is to provide an embedded optical fiber radiation dose detector, which monitors a radiation absorbed dose at a radiation area, comprising: a first optical fiber probe, wherein a first end of the first optical fiber probe is connected to a first light intensity detector, and a second end of the first optical fiber probe is a detecting end, wherein a first fluorescent material is embedded in a terminal of the detecting end of the first optical fiber probe.

Preferably, a metal marker is circumferentially arranged on the terminal of the detecting end of the first optical fiber probe.

Preferably, the first fluorescent material is an inorganic fluorescent material or an organic fluorescent material.

Preferably, the first optical fiber probe is a plastic optical fiber or a PMMA optical fiber.

Preferably, an interior of the terminal of the detecting end of the first optical fiber probe has a micro-groove or a micro-pore, and the first fluorescent material is embedded into the micro-groove or the micro-pore.

Preferably, an end of the micro-groove or the micro-pore is sealed by a sealing material.

Preferably, a capillary optical fiber is welded on the terminal of the detecting end of the first optical fiber probe, and the first material fluorescent material is embedded in the capillary optical fiber, wherein an end of the capillary optical fiber is sealed by a sealing material.

Preferably, the embedded optical fiber radiation dose detector further comprises a second optical fiber probe, wherein a first end of the second optical fiber probe is connected to a second light intensity detector, and a second fluorescent material is embedded in a terminal of a detecting end of the second optical fiber probe.

Preferably, types of the first optical fiber probe and the second optical fiber probe are same, inner diameters of cores of the first optical fiber probe and the second optical fiber probe are equal, and models of the first light intensity detector and the second light intensity detector are identical.

Compared with conventional technologies, the present invention has advantages as follows.

1. The optical fiber probes of the present invention have an embedded structure, wherein an optical fiber probe, whose core is hollow inside, is produced with a micro processing technology, and the fluorescent material is embedded therein, so as to significantly improve an efficiency of coupling radiation-generated fluorescent signals into the cores of the optical fibers, and significantly decreases a size of an optical fiber sensor, in such a manner that the optical fiber sensor is able to enter a human body.

2. Real-time monitoring of in-vivo radiation dose is achieved, for improving efficacy while minimizing side effects of radiation therapy, and providing a tumor location calibration function.

3. The first optical fiber probe and the second optical fiber probed are filled with different fluorescent materials. Furthermore, according to an exclusive method with the two different fluorescent materials, an actual deep and an actual radiation absorbed dose at a radiation area are obtained, which real-time detects while ensures health and safety of a patient during radiotherapy.

These and other objectives, features, and advantages of the present invention will become apparent from the following detailed description, the accompanying drawings, and the appended claims.

DETAILED DESCRIPTION OF THE PREFERRED EMBODIMENT

Figure 1:
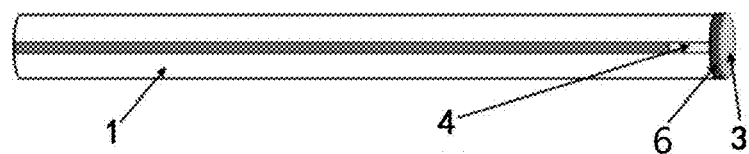
FIG. 1 is a sketch view of an optical fiber probe according to a preferred embodiment 1 of the present invention.
Figure 2:
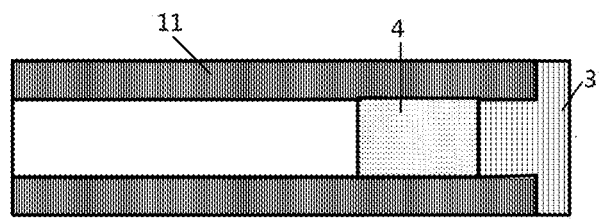
FIG. 2 is an axial-sectional view of the optical fiber probe according to the preferred embodiment 1 of the present invention.
Figure 3:
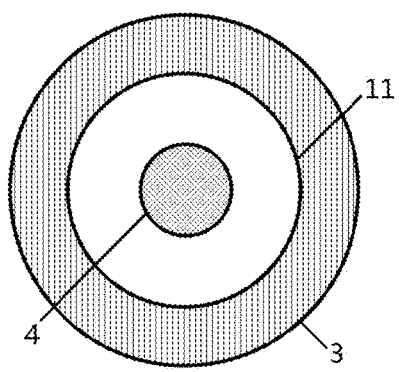
FIG. 3 is a radial-sectional view of the optical fiber probe according to the preferred embodiment 1 of the present invention.

Referring to the drawings, the present invention is illustrated further illustrated.

Preferred Embodiment 1

Referring to FIGS. 1-4, a sketch view, an axial-sectional view, and a radial-sectional view of an optical fiber probe according to a preferred embodiment 1 of the present invention are illustrated, and a sketch view of an embedded optical fiber radiation dose detector according to the preferred embodiment 1 of the present invention is illustrated.

Referring to FIGS. 1-4, an embedded optical fiber radiation dose detector, which monitors a radiation absorbed dose at a radiation area, is illustrated, comprising: a first optical fiber probe 11, wherein a first end of the first optical fiber probe 11 is connected to a first light intensity detector 21, and a second end of the first optical fiber probe 11 is a detecting end, wherein a first fluorescent material is embedded in a terminal of the detecting end of the first optical fiber probe 11.

Figure 4:
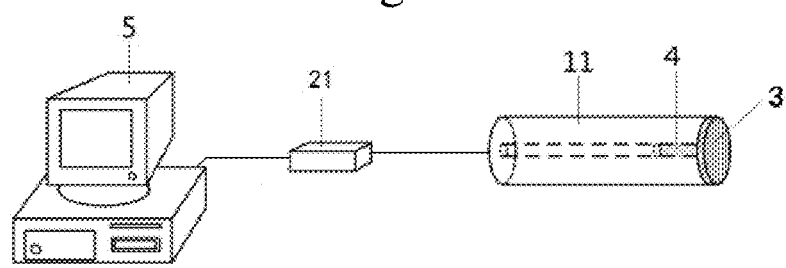
FIG. 4 is a sketch view of an embedded optical fiber radiation dose detector according to the preferred embodiment 1 of the present invention.

Utilization of the embedded optical fiber radiation dose detector is as follows: referring to FIG. 4, when the first optical fiber probe 11 is deeply inserted to a position above tumor cells of a patient, the first fluorescent material is radiated by an X-ray and thus emitting fluorescent lights; the fluorescent lights are transmitted by the first optical fiber probe 11 and then received by the first light intensity detector 21; by treatment with a computer 5, fluorescent intensity accumulation of the first fluorescent material is obtained, wherein radiation comprises α-ray, γ-ray, X-ray and electronic radiation.

The optical fiber probes of the present invention have an embedded structure, wherein an optical fiber probe, whose core is hollow inside, is produced with a micro processing technology, and the fluorescent material is embedded therein, so as to significantly improve an efficiency of coupling radiation-generated fluorescent signals into the cores of the optical fibers, and significantly decreases a size of an optical fiber sensor, in such a manner that the optical fiber sensor is able to enter a human body. Real-time monitoring of in-vivo radiation dose is achieved, for improving efficacy while minimizing side effects of radiation therapy, and providing a tumor location calibration function.

Preferred Embodiment 2

According to the above embedded optical fiber radiation dose detector, a difference of the preferred embodiment 2 is that the first optical fiber probe 11 is a polymer optical fiber, the terminal of the detecting end of a core the polymer optical fiber has a micro-pore 4, and the first fluorescent material is embedded into the micro-pore 4, wherein an end of the micro-pore 4 is sealed by a sealing material 3.

A metal marker is circumferentially arranged on the terminal of the detecting end of the polymer optical fiber. The polymer optical fiber is a plastic optical fiber or a PMMA optical fiber.

Preferred Embodiment 3

According to the above embedded optical fiber radiation dose detector, a difference of the preferred embodiment 3 is that the first optical fiber probe 11 is a polymer optical fiber, the terminal of the detecting end of a core of the polymer optical fiber has a micro-groove 4, and the first fluorescent material is embedded into the micro-groove 4, wherein an end of the micro-groove 4 is sealed by a sealing material 3.

Preferred Embodiment 4

Figure 5:
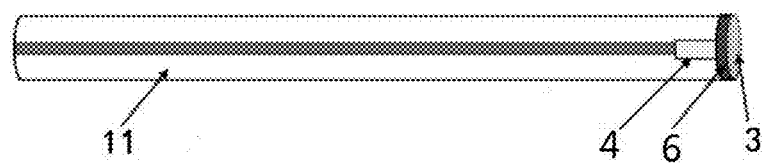
FIG. 5 is a sketch view of an optical fiber probe according to a preferred embodiment 4 of the present invention.

According to the above embedded optical fiber radiation dose detector, a difference of the preferred embodiment 4 is that: referring to FIG. 5, a sketch view of an optical fiber probe according to a preferred embodiment 4 of the present invention is illustrated, wherein the first optical fiber probe 11 is a polymer optical fiber, a capillary optical fiber 4 is welded on the terminal of the detecting end of a core of the polymer optical fiber, and the first material fluorescent material is embedded in the capillary optical fiber 4, wherein an end of the capillary optical fiber 4 is sealed by a sealing material 3.

Preferred Embodiment 5

According to the above embedded optical fiber radiation dose detector, a difference of the preferred embodiment 5 is that the first fluorescent material is an inorganic fluorescent material or an organic fluorescent material, wherein the inorganic fluorescent material comprises ZnS, $SrAl_2O_4$, $CaAl_2O_4$, CsI:Tl, and $Gd_2O_2S:Eu$; and the organic fluorescent material comprises Rhodamine and derivatives thereof, coumarin derivatives, pyrazoline derivatives, and triphenyl amine derivatives.

Preferred Embodiment 6

Figure 6:
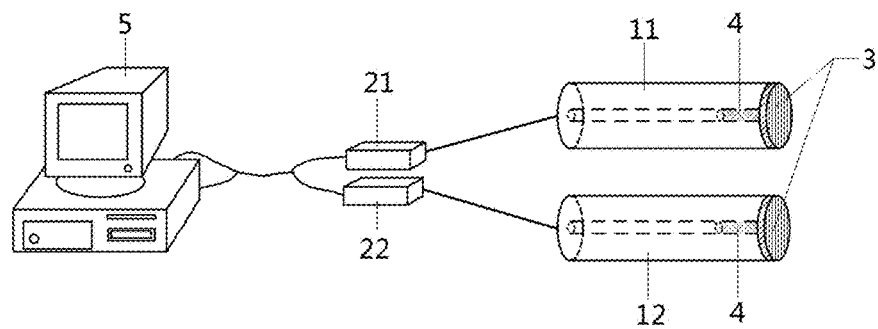
FIG. 6 is a sketch view of an embedded optical fiber radiation dose detector according to a preferred embodiment 6 of the present invention.

According to the above embedded optical fiber radiation dose detector, a difference of the preferred embodiment 6 is that: referring to FIG. 6, a sketch view of an embedded optical fiber radiation dose detector according to a preferred embodiment 6 of the present invention is illustrated, wherein the embedded optical fiber radiation dose detector further comprises a second optical fiber probe 12, wherein a first end of the second optical fiber probe 12 is connected to a second light intensity detector 22, and a second fluorescent material is embedded in a terminal of a detecting end of the second optical fiber probe.

Utilization of the embedded optical fiber radiation dose detector is as follows: referring to FIG. 6, when the first optical fiber probe 11 and the second optical fiber probe 12 are deeply inserted to a position above tumor cells of a patient, the first fluorescent material and the second fluorescent material are radiated and thus emitting fluorescent lights; the fluorescent lights are transmitted by the first optical fiber probe 11 and the second optical fiber probe 12, and then received by the first light intensity detector 21 and the second light intensity detector 22; by treatment with a computer 5, fluorescent intensity accumulations of the first fluorescent material and the second fluorescent material are obtained, wherein radiation comprises α-ray, γ-ray, X-ray and electronic radiation.

Preferred Embodiment 7

According to the above embedded optical fiber radiation dose detector, a difference of the preferred embodiment 7 is that types of the first optical fiber probe 11 and the second optical fiber probe 12 are same, and inner diameters of cores of the first optical fiber probe 11 and the second optical fiber probe 12 are equal, in such a manner that when a same signal respectively passes through the first optical fiber probe 11 and the second optical fiber probe 12, parameters such as light intensities and noises generated in the first optical fiber probe 11 and the second optical fiber probe 12 are same. As a result, during testing, results are not affected by the above parameters.

Models of the first light intensity detector 21 and the second light intensity detector 22 are identical. As a result, when detecting, results of the first intensity detector 21 and the second light intensity detector 22 are able to be directly compared due to identical performance parameters, which not only increases an experimental efficiency, but also improves an experimental accuracy.

Preferred Embodiment 8

Figure 7:
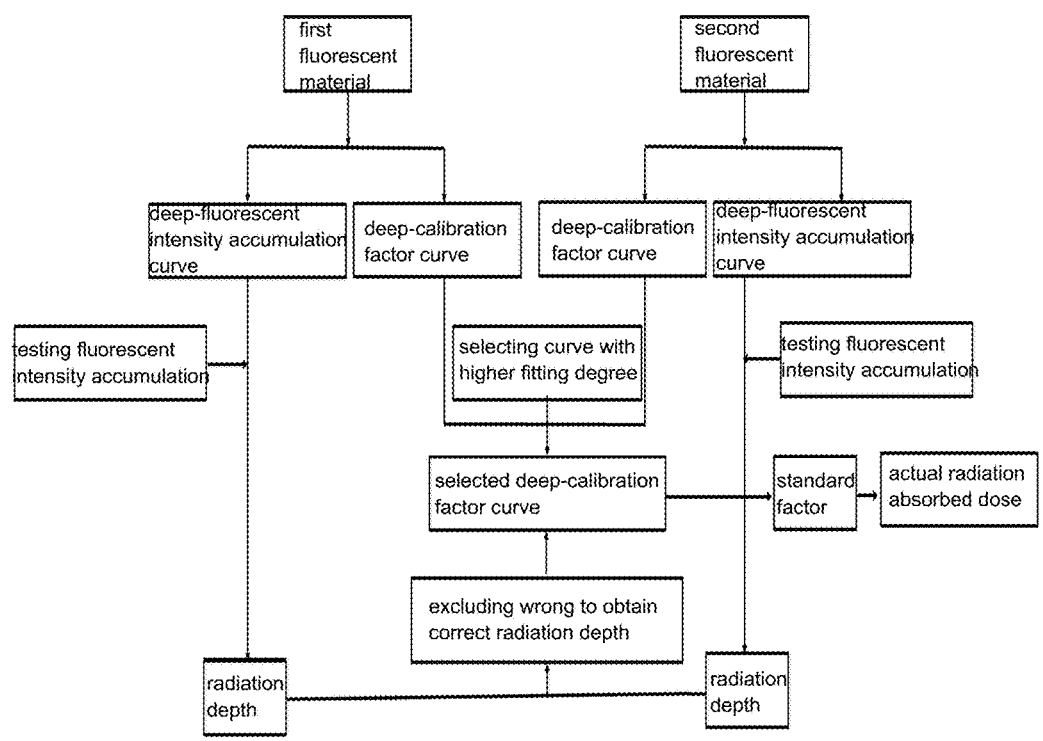
FIG. 7 is a flow chart for detecting an actual radiation absorbed dose at a radiation area according to the present invention.

According to the above embedded optical fiber radiation dose detector, a difference of the preferred embodiment 8 is that a method of the first optical fiber probe 11 and the second optical fiber probe 12 for detecting an actual radiation absorbed dose at a radiation area are as follows, wherein referring to FIG. 7, a flow chart for detecting the actual radiation absorbed dose at the radiation area according to the present invention is illustrated:

(1) drawing a standard curve:

drawing a deep-fluorescent intensity accumulation standard curve and a deep-calibration factor standard curve:

wherein a water tank with water equivalent characteristics is used for simulating human tissue muscles; the first optical fiber probe 11, the second optical fiber probe 12 and a medical standard ionization chamber are arranged as deep as the water tank; due to different depth responses of the first fluorescent material and the second fluorescent material, during radiation, a photon counter displays the fluorescent intensity accumulations of the first fluorescent material and the second fluorescent material, and the medical standard ionization chamber also displays the actual radiation absorbed dose at the moment; by changing depths of the first optical fiber probe 11, the second optical fiber probe 12 and the medical standard ionization, depth-corresponded fluorescent intensity accumulations of the first fluorescent material and the second fluorescent material and the actual radiation absorbed dose not depth-corresponded are obtained; after software fitting, a deep-fluorescent intensity accumulation curve corresponding to the first fluorescent material and a deep-fluorescent intensity accumulation curve corresponding to the second fluorescent material during radiation therapy are obtained; because of a linear relationship between the fluorescent intensity accumulation and the actual radiation absorbed dose, ratios of the fluorescent intensity accumulations of the first fluorescent material at each depth and the actual radiation absorbed dose are used as calibration factors for fitting a deep-calibration factor curve of the first fluorescent material, and ratios of the fluorescent intensity accumulations of the second fluorescent material at each depth and the actual radiation absorbed dose are used as calibration factors for fitting a deep-calibration factor curve of the second fluorescent material;

(2) keeping the deep-calibration factor curve with a high fitting degree:

wherein a fitting degree of the deep-calibration factor curve of the first fluorescent material is compared with a fitting degree of the deep-calibration factor curve of the second fluorescent material, so as to keep the deep-calibration factor curve with a higher fitting degree;

(3) testing and excluding wrong solutions for obtaining a correct radiation depth:

wherein during testing a tissue at the tumor area of the patient with the embedded optical fiber radiation dose detector, the fluorescent intensity accumulations of the first fluorescent material and the second fluorescent material are obtained; because the deep-fluorescent intensity accumulation fitted curve is a one element multiple equation, when introducing the fluorescent intensity accumulations of the first fluorescent material and the second fluorescent material into the corresponding deep-fluorescent intensity accumulation curve, both the first fluorescent material and the second fluorescent material will obtain a plurality of depth values, wherein there must be a depth value A similar to an actual depth value among the depth values corresponding to the first fluorescent material, and there must be a depth value B similar to the actual depth value among the depth values corresponding to the second fluorescent material, and an absolute value of a difference value between the depth value A and the depth value B is smaller than any other difference values between two depth values, then an actual radiation depth equals to an average value of the depth A and the depth B; and (4) obtaining an actual radiation absorbed dose:

wherein the actual radiation depth is introduced into the deep-calibration factor curve with the higher fitting degree for calculating the calibration factor, and the actual radiation absorbed dose is further obtained.

Preferred Embodiment 9

According to the above embedded optical fiber radiation dose detector, a difference of the preferred embodiment 9 is that excluding the wrong solutions for obtaining the correct radiation depth is as follows.

According to the preferred embodiment 6, the first fluorescent material is CsI:Tl, and the second fluorescent material is $Gd_2O_2S$:Eu, wherein corresponding deep-fluorescent intensity accumulations and calculated depth values of the CsI:Tl the $Gd_2O_2S$:Eu are as follows.

For the first fluorescent material CsI:Tl:

when x is 0.5 cm-2.5 cm, a fitted curve of the CsI:Tl is: y=8612136+1396560x−326671x$^2$;

when x is 2.5 cm-10.0 cm, a fitted curve of the CsI:Tl is: y=10303441−64415x−17822x$^2$+135x$^3$;

calculated results of the CsI:Tl according to the fluorescent intensity accumulation are:

| fluorescent material | actual depth (cm) | fluorescent intensity accumulation | x$_1$ | x$_2$ | x$_3$ | x$_4$ | x$_5$ |
|---|---|---|---|---|---|---|---|
| CsI: Tl | 1.0 | 9682025 | −7.70 | 135.29 | 4.42 | 1.00 | 3.28 |
| | 2.0 | 10098571 | −5.48 | 135.45 | 2.04 | 2.28 | 2.00 |
| | 3.0 | 9861776 | −6.87 | 135.36 | 3.52 | 3.00 | 1.28 |
| | 4.0 | 9795998 | −7.19 | 135.34 | 3.87 | 3.11 | 1.17 |
| | 5.0 | 9541784 | −8.27 | 135.23 | 5.05 | 3.45 | 0.82 |
| | 6.0 | 9277766 | −9.22 | 135.13 | 6.10 | 3.73 | 0.55 |
| | 7.0 | 9035466 | −9.98 | 135.03 | 6.97 | 3.95 | 0.33 |
| | 8.0 | 8721240 | −10.88 | 134.90 | 7.99 | 4.20 | 0.08 |
| | 9.0 | 8389616 | −11.73 | 134.77 | 8.97 | 4.43 | −0.15 |
| | 10.0 | 8004669 | −12.62 | 134.62 | 10.02 | 4.67 | −0.40 |

For the first fluorescent material Gd$_2$O$_2$S:Eu:

when x is 0.5 cm-10.0 cm, a fitted curve of the Gd$_2$O$_2$S:Eu is: y=9653313+532590x−101010x$^2$+3840x$^3$;

calculated results of the Gd$_2$O$_2$S:Eu according to the fluorescent intensity accumulation are:

| fluorescent material | actual depth (cm) | fluorescent intensity accumulation | x$_1$ | x$_2$ | x$_3$ |
|---|---|---|---|---|---|
| Gd$_2$O$_2$S: Eu | 1.0 | 10025008 | 0.82 | 19.41 | 6.06 |
| | 2.0 | 10394165 | 2.33 | 19.78 | 4.19 |
| | 3.0 | 10439880 | 2.85 | 19.83 | 3.62 |
| | 4.0 | 10346452 | 2.01 | 19.74 | 4.56 |
| | 5.0 | 10313350 | 1.83 | 19.70 | 4.76 |
| | 6.0 | 10026910 | 0.83 | 19.41 | 6.06 |
| | 7.0 | 9726377 | 0.14 | 19.09 | 7.07 |
| | 8.0 | 9442152 | −0.37 | 18.74 | 7.92 |
| | 9.0 | 9085465 | −0.91 | 18.26 | 8.94 |
| | 10.0 | 8700436 | −1.40 | 17.64 | 10.06 |

Referring to the above tables, it is concluded that the correct radiation depths z after excluding the wrong solutions are:

| actual depth (cm) | average radiation depth Z = (A + B)/2 | CsI: Tl (selected depth A) | Gd$_2$O$_2$S: Eu (selected depth B) |
|---|---|---|---|
| 1.0 | 0.91 | 1.00 | 0.82 |
| 2.0 | 2.31 | 2.28 | 2.33 |
| 3.0 | 3.57 | 3.52 | 3.62 |
| 4.0 | 4.22 | 3.87 | 4.56 |
| 5.0 | 4.91 | 5.05 | 4.76 |
| 6.0 | 6.08 | 6.10 | 6.06 |
| 7.0 | 7.02 | 6.97 | 7.07 |
| 8.0 | 7.96 | 7.99 | 7.92 |
| 9.0 | 8.96 | 8.97 | 8.94 |
| 10.0 | 10.04 | 10.02 | 10.06 |

Therefore, the corrected radiation depth is quite similar to the actual depth. Furthermore, according to an exclusive method with the two different fluorescent materials, the actual deep and an actual radiation absorbed dose at the radiation area are obtained, which real-time detects while ensures health and safety of a patient during radiotherapy.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An embedded optical fiber radiation dose detector, which monitors a radiation absorbed dose at a radiation area, comprising: a first optical fiber probe, wherein a first end of the first optical fiber probe is connected to a first light intensity detector, and a second end of the first optical fiber probe is a detecting end, wherein a first fluorescent material is embedded in a terminal of the detecting end of the first optical fiber probe;

wherein the first fluorescent material is an inorganic fluorescent material or an organic fluorescent material;

wherein the first optical fiber probe is a plastic optical fiber or a PMMA optical fiber;

wherein an interior of the terminal of the detecting end of the first optical fiber probe has a micro-groove or a micro-pore, and the first fluorescent material is embedded into the micro-groove or the micro-pore, wherein an end of the micro-groove or the micro-pore is sealed by a sealing material;

wherein the embedded optical fiber radiation dose detector further comprises a second optical fiber probe, wherein a first end of the second optical fiber probe is connected to a second light intensity detector, and a second fluorescent material is embedded in a terminal of a detecting end of the second optical fiber probe;

wherein the first fluorescent material and the second fluorescent material have different responses to doses and depths.

2. The embedded optical fiber radiation dose detector, as recited in claim 1, wherein types of the first optical fiber probe and the second optical fiber probe are same, inner diameters of cores of the first optical fiber probe and the second optical fiber probe are equal, and models of the first light intensity detector and the second light intensity detector are identical.

3. An embedded optical fiber radiation dose detector, which monitors a radiation absorbed dose at a radiation area, comprising: a first optical fiber probe, wherein a first end of the first optical fiber probe is connected to a first light intensity detector, and a second end of the first optical fiber probe is a detecting end, wherein a first fluorescent material is embedded in a terminal of the detecting end of the first optical fiber probe;
   wherein the first fluorescent material is an inorganic fluorescent material or an organic fluorescent material;
   wherein the first optical fiber probe is a plastic optical fiber or a PMMA optical fiber;
   wherein an interior of the terminal of the detecting end of the first optical fiber probe has a micro-groove or a micro-pore, and the first fluorescent material is embedded into the micro-groove or the micro-pore, wherein an end of the micro-groove or the micro-pore is sealed by a sealing material;
   wherein a capillary optical fiber is welded on the terminal of the detecting end of the first optical fiber probe, and the first material fluorescent material is embedded in the capillary optical fiber, wherein an end of the capillary optical fiber is sealed by a sealing material;
   wherein the embedded optical fiber radiation dose detector further comprises a second optical fiber probe, wherein a first end of the second optical fiber probe is connected to a second light intensity detector, and a second fluorescent material is embedded in a terminal of a detecting end of the second optical fiber probe;
   wherein the first fluorescent material and the second fluorescent material have different responses to doses and depths.

4. The embedded optical fiber radiation dose detector, as recited in claim 3, wherein types of the first optical fiber probe and the second optical fiber probe are same, inner diameters of cores of the first optical fiber probe and the second optical fiber probe are equal, and models of the first light intensity detector and the second light intensity detector are identical.

* * * * *